Jan. 4, 1949. C. JONES 2,458,176
ANIMAL TRAP
Filed Nov. 22, 1944 2 Sheets-Sheet 1
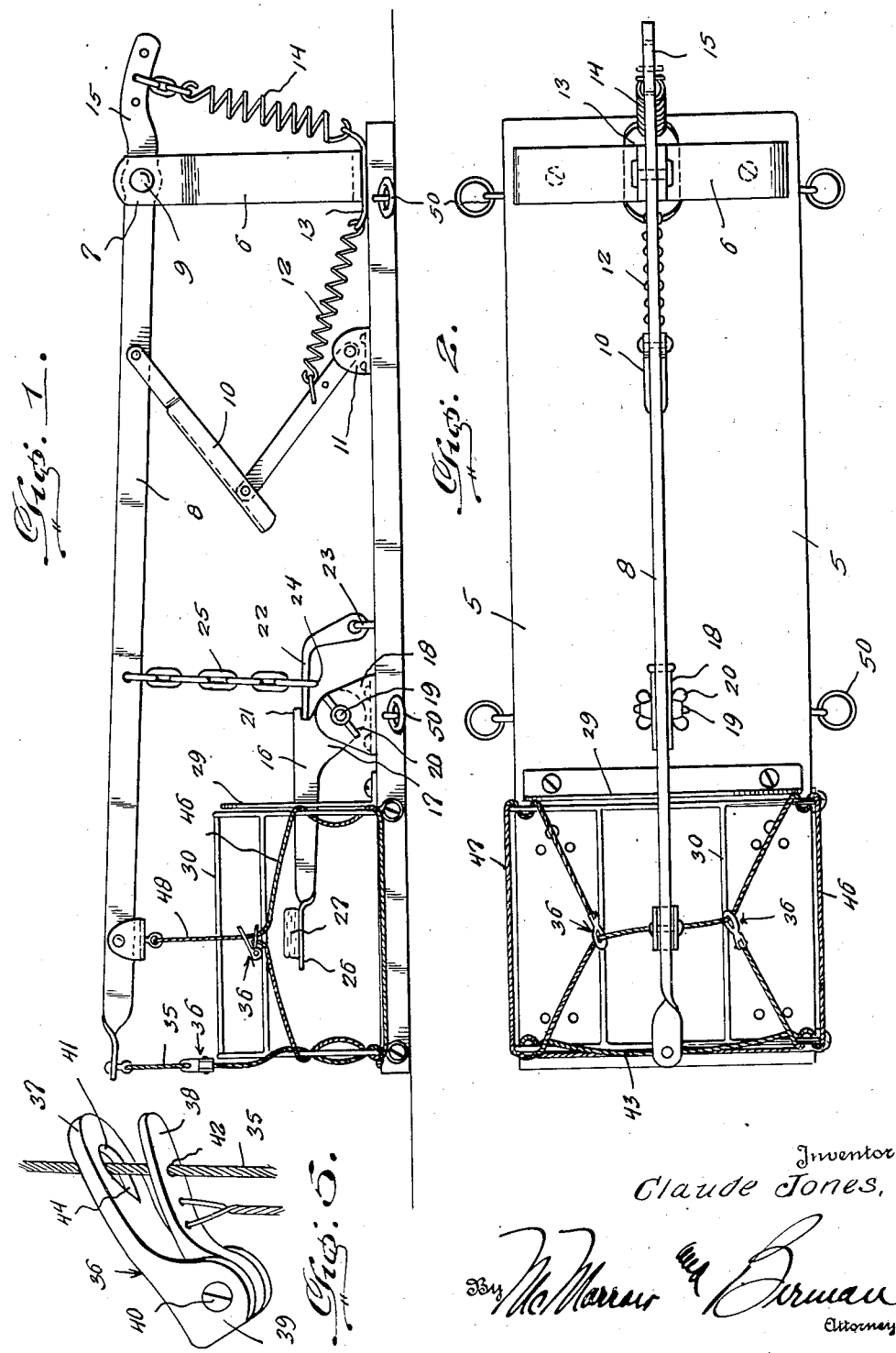
Inventor
Claude Jones,

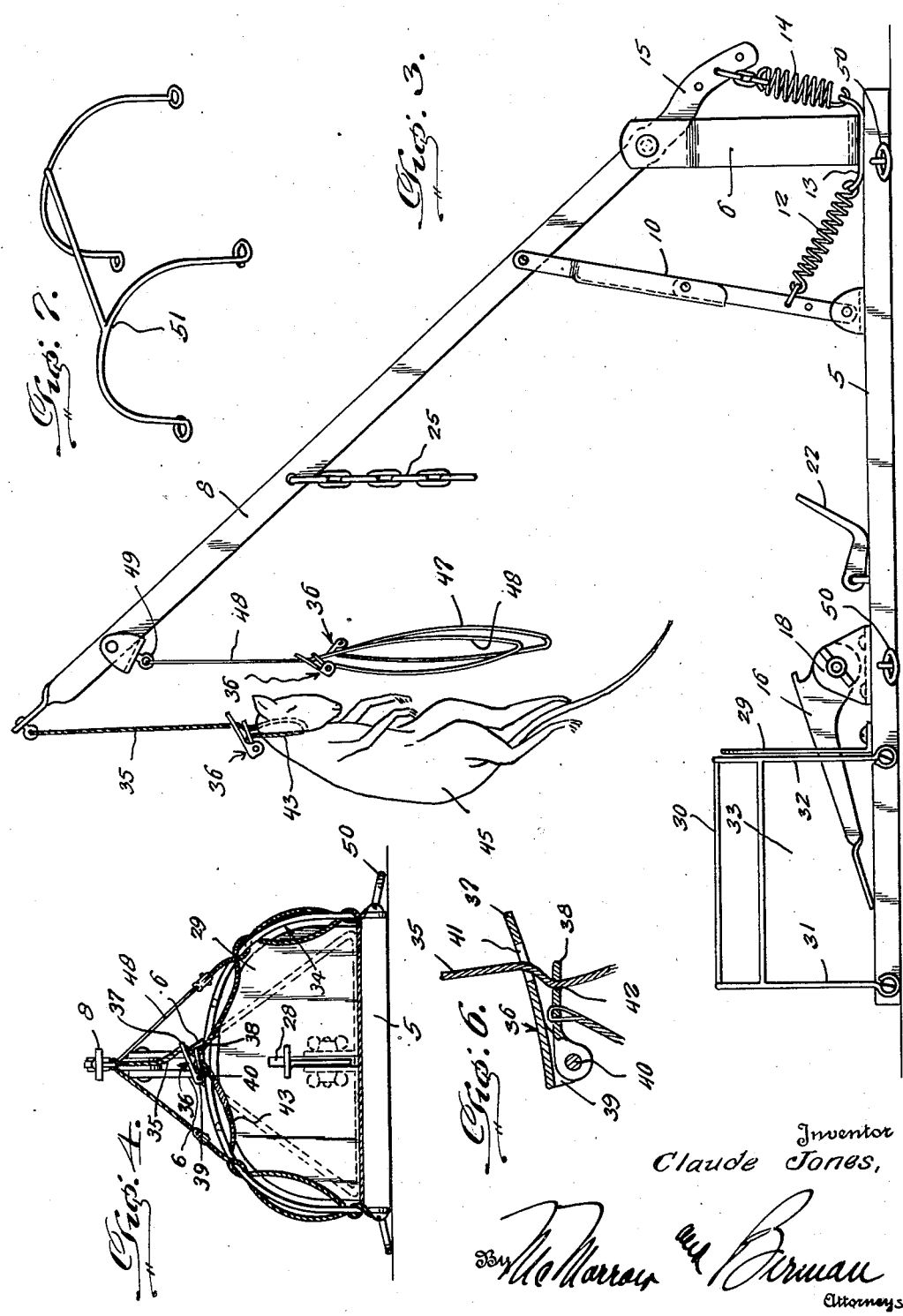

Patented Jan. 4, 1949

2,458,176

UNITED STATES PATENT OFFICE 2,458,176

ANIMAL TRAP

Claude Jones, Jefferson City, Mo., assignor of one-sixth to Eri E. Varble, Jefferson City, Mo.

Application November 22, 1944, Serial No. 564,634

5 Claims. (Cl. 43—87)

The present invention relates to new and useful improvements in animal traps of a type commonly known as a snare trap and the invention has for its primary object to provide a device of this character adapted for catching the animal in a manner so as to avoid injury or damage to the fur thereof.

An important object of the present invention is to provide a trap of this character embodying a plurality of noose members together with a frame forming side and front entrances around which the noose members are respectively placed, all of said noose members being operated by a trigger released, spring actuated, arm whereby to provide a multiplicity of snares and thus reduce the possibility of the animal escaping.

A further important object of the present invention is to provide automatic means for locking the snares in their closed position about the animal to prevent loosening of the snares when the trap is sprung.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a side elevational view showing the trap sprung.

Figure 4 is a front elevational view.

Figure 5 is an enlarged perspective view of one of the locks for the noose.

Figure 6 is a sectional view through one of the locks, and

Figure 7 is a perspective view of a modified form of frame for supporting the noose in its open position.

Referring now to the drawings in detail wherein for the purpose of illustration I have disclosed a preferred embodiment of the invention, the numeral 5 designates a base preferably constructed of light weight wood and from one end of which a support 6 rises. The support is of substantially triangular shape and has spaced apart upper ends 7 between which an arm 8 is positioned and pivotally attached adjacent one end thereof by means of a pin 9.

A sectional brace 10 pivotally connects the arm 8 to the base 5 by means of a bracket 11 at a point forwardly of the support 6. A coil spring 12 is attached at one end to the lower section of the brace and has its other end secured to a plate 13 positioned under the bottom portion of the support 6 and retained thereby to the base 5, the plate 13 extending forwardly and rearwardly of the support.

To the rear end of the plate 13 is also attached a coil spring 14 which extends upwardly therefrom for attaching to the rearwardly projecting end 15 of the arm 8.

The spring 14 urges the front end of the arm upwardly and the brace 10, with the spring 12, serves to retain the front end of the arm in its upwardly extended position as shown in Figure 3 of the drawings.

The front end of the arm 8 overlies the base 5 and is secured in its downwardly disposed position by means of a trigger 16 having a downwardly extending lower edge 17 positioned between a pair of brackets 18 secured to the base, the trigger being pivotally mounted to the brackets by means of a pin 19 and wing nut 20 by means of which the pivoted end of the trigger may be frictionally adjusted between the brackets 18.

The rear edge of the trigger 16 is formed with a lip 21 under which one end of a catch 22 is engaged, the catch being pivoted at its rear end in an eye 23 secured to the base. The front end of the catch 22 is inserted in the lowermost link 24 of a chain 25 connected to the arm 8.

The front end of the trigger 16 is flattened as at 26 to form a bait holder for the bait 27.

The trigger 16 projects forwardly through a vertical slot 28 formed in an upstanding shield 29 secured to the base 5 so that the bait 27 is positioned forwardly of the shield.

A reticulated frame 30 is secured to the base 5 with its rear edge slightly spaced forwardly of the shield 29, the top of the frame being rounded and including front and rear legs 31 and 32 which provide a pair of side openings 33 and a front opening 34 to afford access to the interior of the frame. The bait 27 is positioned substantially at the center of the frame as shown in Figure 1 of the drawings.

A flexible member 35, preferably of woven wire, has one end attached to the front end of the arm 8 and its other end attached to a wire or cable clamp indicated generally at 36. The clamp includes an upper plate 37 and a lower plate 38, the upper plate 37 having spaced parallel ears 39 at one end to which the lower plate 38 is pivotally attached by means of a pin 40. The wire 35 is attached to the lower plate 38 intermediate its ends and adjacent the outer ends the plates are formed with openings 41 and 42, respectively, through which the flexible wire member 35 is slidably positioned to form a noose under the clamping member 36.

The openings 41 and 42 of the clamping plates 37 and 38 are in alignment when the plates are moved away from each other as shown in Figure 5 of the drawings and the openings are offset from each other when the plates are moved toward each other as shown in Figure 6. The inner end of the opening 41 in the upper plate 37 converges as shown at 44 to provide friction-gripping engagement with the wire 35 when the plates 37 and 38 are moved toward each other as shown in Figure 6 to thus lock the wire against sliding movement through the clamp.

When the trap is arranged in its set position as shown in Figure 1 of the drawings, the noose 43 is opened so as to substantially extend around the edges of the front opening 34 of the frame 30, the noose being retained in position around the opening by bending the side of the flexible wire forming the noose, as indicated in Figure 4.

In this position the clamping member 36 occupies a position at the top of the opening 34 and with the upper clamping plate 37 raised so that the wire 35 is free in the openings 41 and 43.

When the trap is sprung by the animal moving the trigger 16 so as to release the catch 22 the arm 8 will be swung upwardly by the spring 14, thus drawing the noose 43 through the clamping member 36 to snare the animal 45.

The outwardly extending portions of the noose 43 immediately below the clamping member 36 will retain the upper clamping plate 37 in its raised position until the noose is pulled upwardly and contracted whereupon the upper clamping member 37 will gravitate toward the plate 38 so as to offset the openings 41 and 42 and move the wire 35 into friction gripping engagement with the notch 44 of the opening 41 of the upper clamping plate whereupon the clamping member 36 will lock the noose against opening movement.

Similar noose members 46 and 47 are positioned about the side opening 32 of the frame 30, the noose members 46 and 47 being connected to each other by a single flexible member 48 inserted through an eye 49 pivotally attached to the arm 8 adjacent its outer end.

The side noose members 46 and 47 may be retained in position at the respective sides of the frame 30 by inserting a portion of the noose members between the rear edge of the frame 30 and the shield 29 as shown in Figure 1 of the drawings.

The noose members 43, 46 and 47 accordingly provide snares for the side as well as the front entrances of the trap while the shield 29 closes the back of the frame so that the animal in order to reach the bait 27 must enter the frame from either the front or side entrances thereof.

The base of the trap may be anchored to the ground by means of the rings 50 secured to the side edges thereof.

In Figure 7, I have illustrated a modified form of frame which may be used for catching smaller animals, and which may be used either in place of the frame 30, or in conjunction therewith.

It is believed that the details of construction and manner of use of the device will be readily understood from the foregoing without further detailed explanation.

Having thus described the invention, what I claim is:

1. An animal trap comprising a base, a support rising from the base adjacent one end thereof, an arm pivoted adjacent one end to the upper portion of said support and having a portion extending rearwardly of the support, spring means attached to said rear end of the arm and adapted for yieldably urging the front end of the arm upwardly, a sectional brace connecting the arm to the base at a point forwardly of its pivotal connection, spring means connected to the brace for securing the latter in its upwardly extended position, trigger means releasably securing the arm in its lowermost position, a reticulated frame secured to the front portion of the base under the front end of the arm, said trigger means including a bait holder enclosed within said frame, a shield closing the rear end of the frame, said frame including side and front openings, and a plurality of flexible members attached to the arm, each of said flexible members including a noose portion extending around the edges of said openings.

2. An animal trap comprising a base, a support rising from the base adjacent one end thereof, an arm pivoted adjacent one end to the upper portion of said support and having a portion extending rearwardly of the support, spring means attached to said rear end of the arm and adapted for yieldably urging the front end of the arm upwardly, a sectional brace connecting the arm to the base at a point forwardly of its pivotal connection, spring means connected to the brace for securing the latter in its upwardly extended position, trigger means releasably securing the arm in its lowermost position, a reticulated frame secured to the front portion of the base under the front end of the arm, said trigger means including a bait holder enclosed within said frame, said frame including side and front openings and a shield closing the rear end of the frame, a plurality of flexible wire members attached to the arm, each of said members including a noose extending around the edges of said openings and embracing a portion of the frame to retain said nooses in position.

3. An animal trap comprising a base, an upstanding support arranged contiguous to an end of said base and carried thereby, a longitudinally extending arm pivotally mounted on said support, spring means interconnecting the rear end of said arm to said base for yieldably urging the front end thereof upwardly, a trigger mechanism including a bait supporting holder arranged along said base and spaced from said support, a reticulated frame positioned on said base contiguous to said mechanism and enclosing said bait holder, said frame having front and side openings affording access to the bait on said holder, means for operatively connecting said trigger mechanism to said arm, and a noose carried by the rearward end of said arm extending around each of said openings in embracing relation therewith for constricting each noose upon upward movement of said arm.

4. An animal trap comprising a base, an upstanding support arranged contiguous to an end of said base and carried thereby, a longitudinally extending arm pivotally mounted on said support, spring means interconnecting the rear end of said arm to said base for yieldably urging the front end thereof upwardly, a trigger mechanism including a bait supporting holder arranged along said base and spaced from said support, a reticulated frame positioned on said base contiguous to said mechanism and enclosing said bait holder, said frame having front and side openings affording access to the bait on said holder, means for operatively connecting said trigger mechanism to said arm, a noose carried by the rearward end of said arm extending around each of said openings in embracing relation therewith for constricting each noose upon upward movement of said arm, and means carried by each noose for securing the same in its restricted position.

5. An animal trap comprising a base, an upstanding support arranged contiguous to an end of said base and carried thereby, a longitudinally extending arm pivotally mounted on said support, spring means interconecting the rear end of said arm to said base for yieldably urging the front end thereof upwardly, a yieldable collapsible brace connecting said arm to said base at a point rearwardly of and spaced from said support for maintaining the arm in its upwardly extended position, a trigger mechanism including a bait supporting holder arranged along said base and spaced from said support, a reticulated frame positioned on said base contiguous to said mechanism and enclosing said bait holder, said frame having front and side openings affording access to the bait on said holder, means for operatively connecting said trigger mechanism to said arm, and a noose carried by the rearward end of said arm extending around each of said openings in embracing relation therewith for constricting each noose upon upward movement of said arm.

CLAUDE JONES.

REFERENCES CITED

The following references are of record in the file of this patent:

UNITED STATES PATENTS

| Number | Name | Date |
|---|---|---|
| 322,736 | Marshall | July 21, 1885 |
| 598,438 | Plahn | Feb. 1, 1898 |
| 693,071 | Ruud | Feb. 11, 1902 |
| 817,601 | Werd | Apr. 10, 1906 |
| 1,467,846 | Dugas | Sept. 11, 1923 |
| 1,842,954 | Anderson | Jan. 26, 1932 |